United States Patent
Shielman

Patent Number: 5,460,397
Date of Patent: Oct. 24, 1995

[54] TRUCK TRAILER SLIDING BOGEY

[76] Inventor: Curt Shielman, 4031 Rundlehorn Dr. NE., Calgary, Alberta, Canada, T1Y 2K2

[21] Appl. No.: 323,102

[22] Filed: Oct. 14, 1994

[51] Int. Cl.$^6$ .................................................... B62D 53/06
[52] U.S. Cl. .................... 280/407.1; 280/149.2; 180/209
[58] Field of Search .................. 280/149.2, 407.1, 280/405.1; 180/209, 24.02

[56] References Cited

U.S. PATENT DOCUMENTS

| | | | |
|---|---|---|---|
| 2,831,735 | 4/1958 | Bennett et al. | 280/149.2 |
| 2,860,891 | 11/1958 | Ramun | 280/149.2 |
| 3,146,000 | 8/1964 | Holzman | 280/407.1 |
| 3,778,079 | 12/1973 | Vornberger et al. | 280/149.2 |
| 4,119,328 | 10/1978 | Rhodes | 280/149.2 |
| 5,137,296 | 8/1992 | Forman | 280/149.2 |

FOREIGN PATENT DOCUMENTS

| 1106717 | 4/1989 | Japan | 180/209 |
|---|---|---|---|

Primary Examiner—Mitchell J. Hill
Assistant Examiner—Peter C. English

[57] ABSTRACT

Changing the wheelbase on tractor trailer combinations in an effort to better distribute the cargo load weight has resulted in the use of a sliding bogey from which is suspended the trailer running gear. The sliding bogey is independent from the trailer frame and slides fore and aft along the trailer frame and can be locked into a variety of positions along the trailer frame. Currently available bogey systems utilize sliding members of generally rectangular cross section and are subject to binding both from the build up of road contaminants and the inherent difficulties associated with rectangular sliding mechanisms. A more reliable and substantially sealed sliding system utilizes a pair of generally elongated telescoping tubes, each pair located on either side of the trailer frame with one member of each pair forming an integral part of a sliding bogey while the other member of each pair acts as a support piece for the trailer frame, is fixed to the trailer frame and thus moves with the trailer frame. A plurality of locking pins are used to secure the bogey to the trailer frame in the desired position sufficient to achieve the desired wheelbase.

3 Claims, 3 Drawing Sheets

TRUCK TRAILER SLIDING BOGEY

BACKGROUND—FIELD OF THE INVENTION.

This invention relates to the field of truck semi-trailers and more specifically to mechanisms designed to facilitate the altering of the trailer wheel base by altering the linear position of the trailer frame running gear relative to the trailer body.

BACKGROUND—DESCRIPTION OF KNOWN ART

It has long been understood by long haul truckers and by a variety of governmental bodies that the road safety and drivability of the truck trailer combination is greatly influenced by the positioning of the trailer cargo weight relative to the trailer running gear. In short, for optimum and safe performance the cargo weight must be balanced to the trailer.

In an effort to provide a mechanism by which the cargo weight may be shifted to achieve balance much inventive ingenuity has been applied leading to the development of the "sliding bogey".

Essentially the sliding bogey consists of a frame, independent from the trailer frame, to which is attached the trailer running gear—spring shackles, springs, torque arms, axles etc. The bogey frame is free to slide fore and aft along either the inside or outside edge of the trailer frame thus lengthening or shortening the truck trailer combination wheelbase.

Generally the bogey frame is secured and locked into a single position on the trailer frame using a plurality of pins inserted into aligned holes in both flames.

In use, the truck driver first disengages the locking pins and moves the truck trailer combination ahead or back—depending upon the desired wheelbase; the trailer frame slides upon the bogey frame until the desired position is reached and the driver then engages the locking pins to maintain this position.

In practice, however, it is more usual to discover that both frames are locked into a single position by accumulation of road dirt and other contaminants between the sliding surfaces of the frames thus rendering the task of shifting the trailer body difficult and often, time consuming.

In many cases it is not unusual for the driver to be completely unable to shift the trailer thus rendering the truck trailer combination unsafe and, in some cases, illegal for road use.

Not surprisingly then, considerable effort has been expended to ensure a good, easily maintainable sliding fit between trailer frame and bogey frame is achieved. Unfortunately, the nature of the systems currently in use are, by their very nature, utilizing as they do rectilinear members, inherently difficult to seal and maintain adequate lubrication. The present invention, an embodiment of which is hereinafter described in detail, overcomes many of the shortcomings associated with current systems by providing a simple, efficient, easily maintainable and to a large extent self-sealing sliding mechanism utilizing tubular sliding members rather than the traditional rectangular sliding members.

SUMMARY

According to one aspect the present invention is a truck trailer sliding bogey comprising:

a first pair of elongated semi-circular tubular sliding means spaced parallel to each other and maintained in alignment with each other by rigid cross support means;

a second pair of elongated semi-circular tubular sliding means slidably mounted over the first pair of sliding means and free to move fore and aft thereupon;

means for locking the second pair of sliding means at predetermined intervals along the surfaces of the first pair of sliding means so that the positioning of the second sliding means is adjustable relative to the first sliding means;

means for securing each of the second pair of sliding means to the rear undersurface of a truck trailer body;

means for securing the truck trailer running gear to the rigid cross support means;

means for lubricating the sliding surfaces of each of the first sliding and second sliding means;

means for substantially containing the lubricant within the sliding surfaces of the first and second sliding means; and means for substantially sealing the sliding surfaces of the first and second sliding means against contaminants.

DRAWING FIGURES

A more detailed description of a preferred embodiment of the present invention follows having reference to the accompanying drawings wherein closely related drawings have the same number but differing alphabetical suffixes and wherein.

DESCRIPTION

Figure 1:
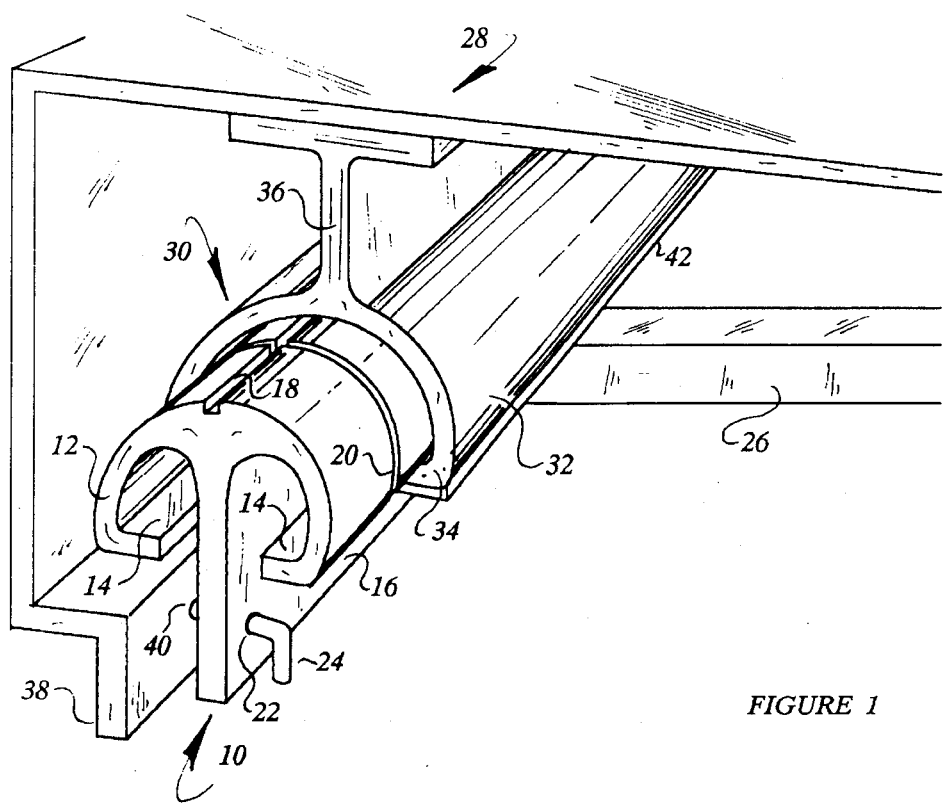
FIG. 1 is a perspective view of a sliding tube pair showing the relative positioning of the components.
Figure 2:
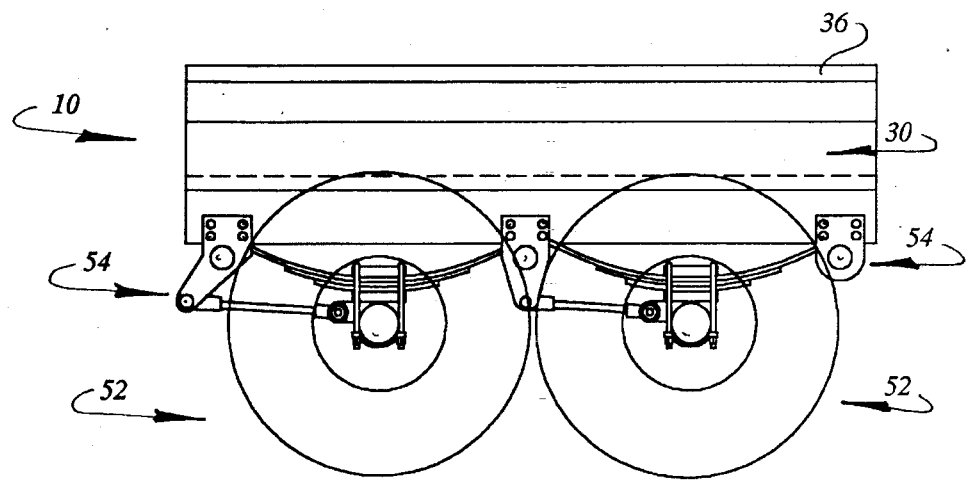
FIG. 2 is a side view of the sliding bogey showing the running gear in place.
Figure 3:
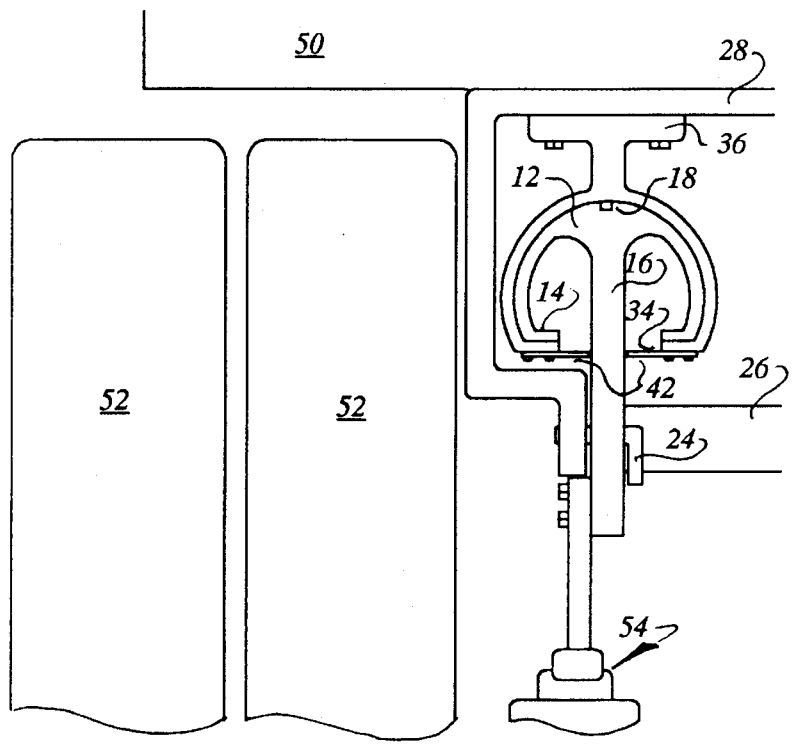
FIG. 3 is an end view of one side of a trailer showing the sliding bogey in place.
Figure 4:
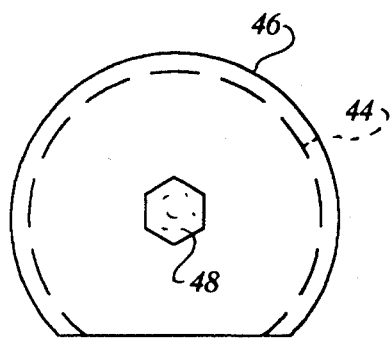
FIG. 4 is an end view of one tubular slider showing the placement of a wiper end seal.
Figure 4A:
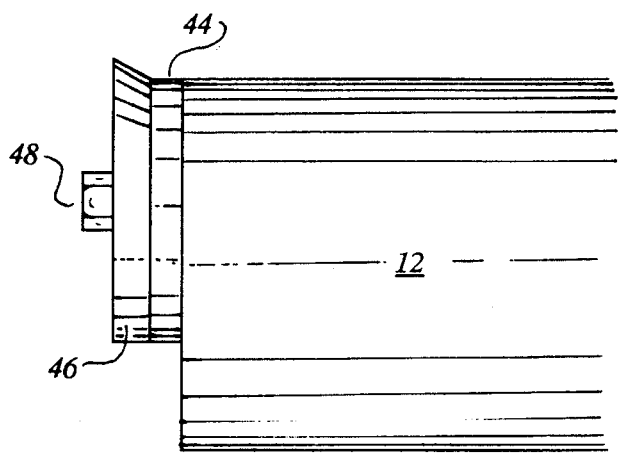
FIG. 4A is a side view of a wiper end seal.
Figure 5:
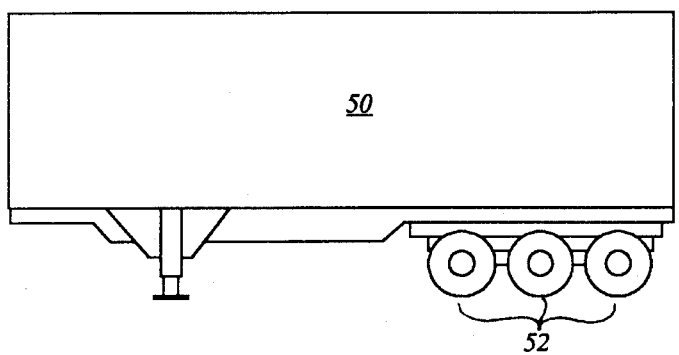
FIG. 5 is a side view of a typical semi-trailer.
Figure 5A:
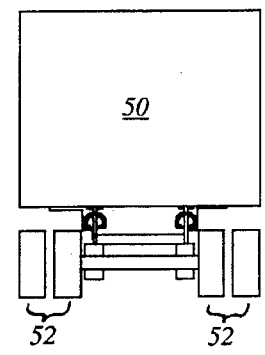
FIG. 5A is an end view of a typical semi-trailer utilizing the sliding bogey of the present invention.

Refer to FIGS. 1 to 5

A first bogey frame member 10 is comprised of an elongate rigid tubular body 12 having an axial opening along its length and inwardly curving lower ends 14. A rigid support beam 16 is integral to the tubular body 12 and runs the full length of the inner surface of the tubular body 12 and extends downward from the tubular body 12 to a distance below the inwardly curving ends 14 of the tubular body 12.

A substantially centrally located first machined groove 18 positioned at the topmost point of the outer surface of the tubular body 12 serves as a lubrication channel and extends the full length of the tubular body 12.

A plurality of circumferentially positioned machined grooves 20 intersect first machined groove 18 at regular intervals along the outer surface of the tubular body 12 thus forming a network of lubrication channels along and across the outer surface of the tubular body 12.

A plurality of through holes 22 of sufficient diameter to accommodate the insertion of locking pins 24 are located along the length of the support beam 16 substantially equidistant apart at intervals of approximately six inches.

The support beam 16 further incorporates a variety of through holes along its surface by means of which the semi-trailer 50 running gear 54 and wheels 52 may be suspended.

A second bogey frame member (not shown) which is essentially a mirror image of the first frame member 10 is located parallel to the first frame member 10 at a distance approximating the width of a typical semi-trailer 50 and both the first frame member 10 and its mirror frame are maintained in parallel alignment by at least a pair of rigid cross supports 26.

A first trailer frame 28 support member 30 is comprised of a rigid tubular body 32 having an axial opening along the full length of the lower surface and having inwardly curving lower ends 34 and of an inside diameter sufficient to provide for a sliding clearance fit to the outer surface of the first bogey frame 10 tubular body 12.

A rigid "I" beam member 36 is integral to the first trailer frame 28 support 30 tubular body 32 and is located substantially centrally to the outer surface of the tubular body 32, extends substantially vertically thereto, runs the full length of the tubular body 32 and serves as a platform upon which is mounted the trailer frame 28.

A lower section 38 of the trailer frame 28 extends downward such as to remain in close proximity to the support beam 16 of the first bogey frame member 10; incorporates a plurality of through holes 40 substantially equal in diameter to the holes 22 in the bogey frame member 10 and spaced apart substantially equal distance as the holes 22 in the bogey frame member 10 so that when aligned with the holes 22 in the bogey frame member 10, the insertion of at least a pair of locking pins 24 secures the bogey frame member 10 to the trailer frame 28.

A second trailer frame 28 support member (not shown) which is essentially a mirror image of the first frame 28 support member 30 is located parallel to the first support member 30 at a distance approximating the width of a typical semi-trailer and both the first support member 30 and its mirror support member are maintained in parallel alignment by virtue of mounting to the underside of the trailer frame 28.

Lubricant may be introduced to the sliding surfaces of the tubular bodies, 12 and 32 respectively by any conventional means such as via grease fittings mounted through the trailer frame 28 support 30 tubular body 32.

A pair of relatively thin flexible strips 42 of uniform wall thickness may be mounted to the underside of the inwardly curving ends 34 of the trailer frame 28 support member 30 tubular body 32 by any appropriate and conventional means such as set screws such that each strip 42 extends inwardly from the tubular member 32 and wipes against the wall on either side of the first bogey frame 10 support beam 16 thus substantially eliminating the ingress of contaminants between the sliding surfaces of the bogey frame 10 tubular body 12 and the trailer frame 28 support member 30 tubular body 32.

Additionally, a semi-circular wiper pad 44 having an outwardly flared wiping edge 46 may be mounted to each end of the bogey frame 10 tubular body 12 by any appropriate and conventional means such as a threaded bolt 48 so that as the trailer frame 28 support member 30 tubular body 32 slides upon the bogey frame 10 tubular body 12 excess lubricant adhering to the inner surface of the support tubular body 32 is wiped inwards and thus retained between the sliding surfaces of the tubular bodies, 12 and 32 respectively.

It will be understood from the foregoing description and consideration of the accompanying drawings that operation of the sliding bogey of the present invention is similar to that of the prior art in that locking pins 24 are first withdrawn from the bogey frame 10 and trailer frame 28 and the truck trailer combination moved either forwards or rearwards allowing the trailer frame 28 to slide upon the bogey frame 10 by virtue of the sliding surfaces formed by the tubular bodies, 12 and 32 respectively. Once positioned correctly, the trailer frame 28 is secured to the bogey frame 10 by insertion of the locking pins 24.

Scope

The preferred embodiment of the present invention as described herein provides a simple to operate, reliable and easy to maintain sliding bogey to facilitate the adjustment of the wheelbase of tractor/trailer combinations by replacing the generally rectangular sliding members of the prior art which are known to be particularly prone to contaminant related sliding problems, with generally tubular sliding members which are inherently easier to seal from contamination and less prone to binding.

Although the above description contains many specificities these should not be construed as limiting the scope of the invention but rather as illustrations of a presently preferred embodiment. Thus the scope of the invention should be determined by the appended claims and their legal equivalents.

I claim:

1. A truck trailer sliding bogey comprising:

a first pair of elongated semi-circular tubular sliding means spaced parallel to each other and maintained in alignment with each other by rigid cross support means;

a second pair of elongated semi-circular tubular sliding means slidably mounted over the first pair of sliding means and free to move fore and aft thereupon;

means for locking the second pair of sliding means at predetermined intervals along the surfaces of the first pair of sliding means so that the positioning of the second sliding means is adjustable relative to the first sliding means;

means for securing each of the second pair of sliding means to the rear undersurface of a truck trailer body;

means for securing the truck trailer running gear to the rigid cross support means;

means for lubricating the sliding surfaces of each of the first sliding and second sliding means;

means for substantially containing the lubricant within the sliding surfaces of the first and second sliding means; and means for substantially sealing the sliding surfaces of the first and second sliding means against contaminants.

2. The structure of claim 1 wherein the lubricating means is comprised of a substantially central longitudinal lubricating channel running the length of the upper surface of the first sliding means, the longitudinal channel cooperating with a plurality of circumferentially located lubricating channels in the surface of the first sliding means.

3. The structure of claim 1 wherein the means for containment of the lubricant is comprised of a generally circular seal located at either end of the first sliding means forming a seal between the outer surface of the first sliding means and the inside surface of the second sliding means.

* * * * *